Patented Feb. 20, 1923.

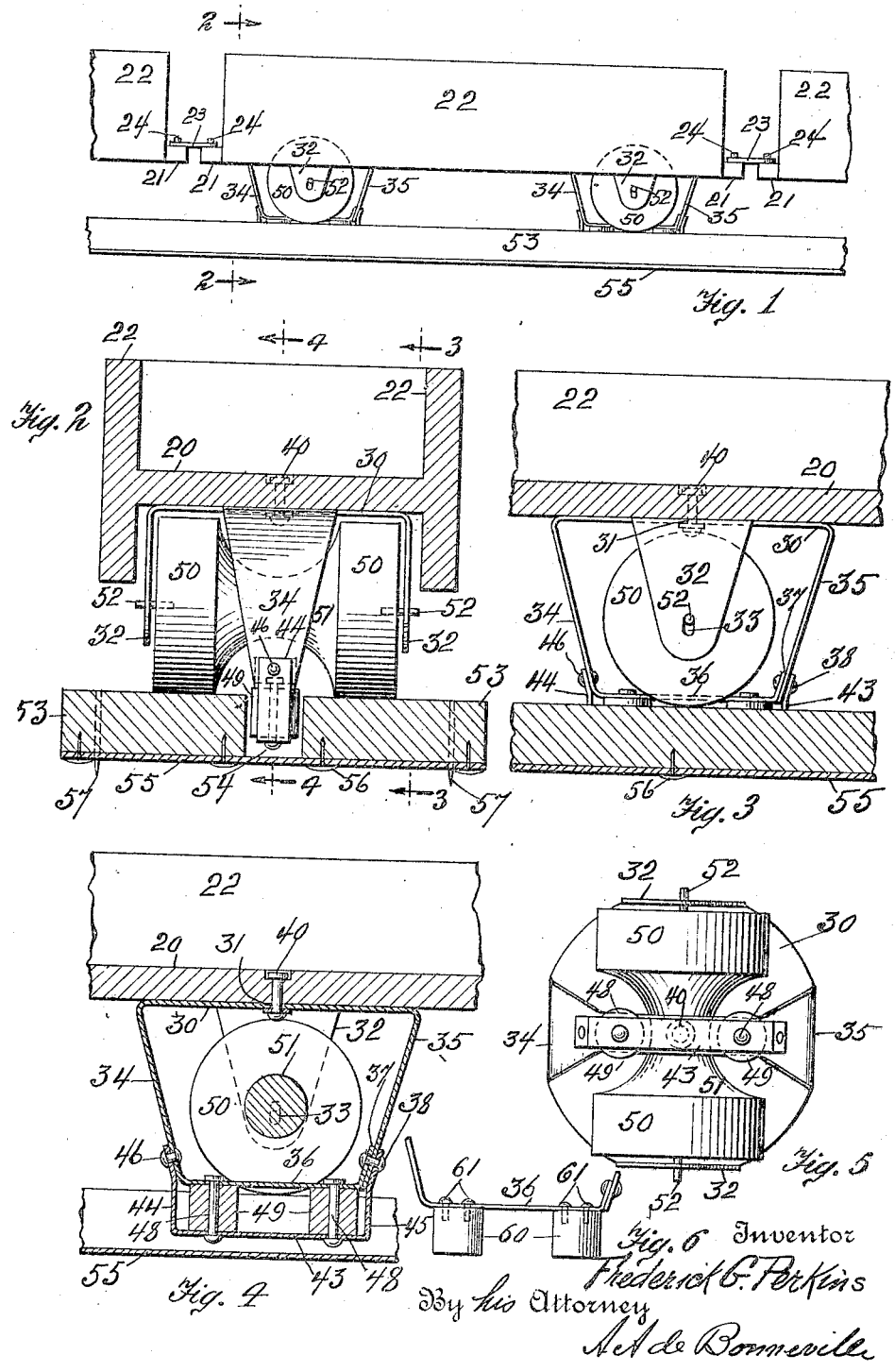

1,446,319

UNITED STATES PATENT OFFICE.

FREDERICK G. PERKINS, OF BAYONNE, NEW JERSEY.

TOY CAR.

Application filed June 21, 1921. Serial No. 479,307.

*To all whom it may concern:*

Be it known that I, FREDERICK G. PERKINS, a citizen of the United States, and resident of Bayonne, in the county of Hudson and State of New Jersey, have invented certain new and useful Improvements in Toy Cars, of which the following is a specification.

This invention relates to toy car. Its object is the production of a car provided with swiveling trucks, that have each journaled therein a roller with a pair of rolling portions.

The accompanying drawings exemplify the invention and in which Fig. 1 represents a side elevation of one of the cars with fragmentary portions of a couple of other cars; Fig. 2 shows an enlarged section of Fig. 1 on the line 2, 2; Fig. 3 indicates a section of Fig. 2 on the line 3, 3; Fig. 4 is a section of Fig. 2 on the line 4, 4; Fig. 5 shows an enlarged bottom view of one of the trucks of the car and Fig. 6 indicates an elevation of a fragmentary portion of a modified detail.

The car is indicated with the body comprising the floor 20 having the extended portions 21 and the sides 22. A coupling 23, by means of the pins 24, connects the extending portions 21.

A pair of trucks is swiveled to the body of the car. Each truck comprises a truck frame with the top plate 30 practically circular in contour and with the central opening 31. Depending side journal lugs 32 extend from opposite sides of the plate 30 and have formed therein elongated journal bearing openings 33. Depending forward and aft lugs 34 and 35 extend from the top plate 30, and the lug 34 has formed therewith the horizontal member 36 which terminates in the flange 37. The flange 37 is fastened to the lug 35 by means of the rivet 38. The plate 30 is swiveled to the floor 20 by means of the king bolt 40. A roller supporting frame is located below and spaced from the member 36 and comprises the bottom plate 43 with the end flanges 44 and 45. The flange 44 is fastened to the lug 34 by means of the rivet 46 and the flange 45 is fastened to the lug 35 by means of the rivet 38. Journal pins 48 extend through the horizontal member 36 and the bottom plate 43. Guide rollers 49 are journaled on the pins 48. Each truck frame has provided therefor a spool shaped roller comprising the rolling portions 50 that are connected by the connecting portion 51. Journaling pins 52 extend from the portions 50 and engage the openings 33 in the lugs 32.

A track comprises strips 53 spaced apart to produce a guide opening 54. A plate 55 is connected to the strips 53 by means of the tacks 56. Pins 57 extend through the strips 53 and the plate 55 to secure the track in place. It is to be understood that the strips 53 can be curved to form curved tracks.

In Fig. 6 the truck of the car is modified by dispensing with the bottom plate 43 and securing to the horizontal member 36 of the truck frame the guide lugs 60 by means of the rivets 61.

To use the car the strips 53 with their plate 55 are fastened to the floor by means of the pins 57. The rolling portions 50 are placed on the strips 53 and the guide rollers 49 or the guide lugs 60 are located in the guide opening 54. The car can then be moved on the track or strips 53 without disarrangement as the guide rollers 49 or the lugs 60 will maintain it in operative position.

Having described my invention what I desire to secure by Letters Patent and claim is:—

1. In a car the combination of a body, a pair of trucks swiveled to the said body, a spool shaped roller journaled in each truck, a pair of lugs formed with each truck, a bottom plate spaced from and connected to said lugs, journal pins extending between one of said lugs and said bottom plate and guide rollers journaled on said pins.

2. In combination the body of a car, a pair of trucks swiveled to the body, a roller supporting frame connected to each truck, guide rollers for each roller supporting frame, a spool shaped roller journaled in each truck and a pair of strips spaced apart forming a guide track for the guide rollers of the truck, the said guide rollers extending into the space between the strips.

3. In a car the combination of a body, a pair of trucks swiveled to said body, each truck comprising a truck frame with a top plate, depending side journal lugs having elongated journal bearings extending from the top plate, a roller with a pair of rolling portions located between said journal lugs, journal pins extending from the rolling portions and engaging the elongated journal bearings in the side journal lugs, depending forward and aft lugs extending from said top plate a horizontal member formed with one of the forward and aft lugs with its end fastened to the other, a bottom plate connected to said forward and aft lugs forming a roller supporting frame and guide rollers journaled between said horizontal member and said bottom plate.

Signed at the borough of Manhattan, city of New York in the county of New York and State of New York this 15th day of June A. D. 1921.

FREDERICK G. PERKINS.